United States Patent Office 3,101,372
Patented Aug. 20, 1963

3,101,372
ω - DIALKYLAMINO - N - [2,3 - BIS(p - METHOXY-PHENYL)PENTYL]ALKANAMIDES AND INTERMEDIATES
Kurt J. Rorig, Glenview, Ill., assignor to G. D. Searle & Co., Chicago, Ill., a corporation of Delaware
No Drawing. Filed Jan. 9, 1962, Ser. No. 165,225
6 Claims. (Cl. 260—562)

This invention relates to ω-dialkylamino-N-[2,3-bis-(alkoxyphenyl)pentyl]alkanamides, intermediates thereto, and processes for the preparation thereof. More particularly, this invention relates to new and useful compounds of the formula

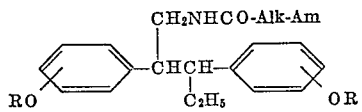

wherein R represents an alkyl radical, Alk represents an alkylene radical, and Am represents an optionally-alkylated amino radical.

Among the alkyl radicals represented by R, especially lower alkyl radicals are preferred, which is to say, methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings having the formula —$C_nH_{2n+1}$ wherein $n$ represents a positive integer less than 8.

The alkylene radicals represented by Alk in the introductory formula hereof also are most desirably of lower order, for example, methylene, ethylene, trimethylene, propylene, tetramethylene, 2-methyl-1,2-propylene, pentamethylene, 2,2-dimethyl-1,3-propylene, and like bivalent, saturated, acylic, straight- or branched-chain, hydrocarbon groupings having the formula —$C_nH_{2n}$— wherein $n$ is defined as before.

Am in the formula for compounds of this invention subsumes both the primary amino radical, —$NH_2$, and secondary and most advantageously tertiary amino radicals resulting from the substitution of 1 or 2 alkyl—especially, lower alkyl—radicals, respectively, for hydrogen therein. The alkyl groupings present when Am designates a tertiary amino radical may either be discrete, thus

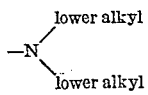

or they may be joined together directly or through oxygen or a second nitrogen atom to compose cyclic amino radicals optimally but not necessarily exclusively comprising at least 4 and as many as 8 carbon atoms—as, for example, in pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- or 6-membered, heterocyclic groupings. The terminal "ino" in the radical names set forth denotes attachment of the radicals thus characterized via nitrogen.

Equivalent to the foregoing basic amides for the purposes of this invention are non-toxic acid addition and quaternary ammonium salts thereof having the formula

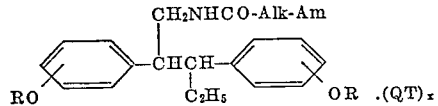

wherein R, Alk, and Am retain the meanings previously assigned; Q is selected from among hydrogen and lower alkyl, hydroxy(lower alkyl), and lower alkenyl radicals, as also such aralkyl radicals as benzyl, phenylethyl, and napththylmethyl; T represents one equivalent of an anion—for example, chloride, bromide, iodide, nitrate,, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid is neither pharmacologically nor otherwise undesirable in pharmaceutical dosage; and $x$ represents a positive integer less than 3.

The compounds to which this invention relates are useful because of their valuable pharmacological properties. Thus, for example, they are anti-ulcerogenic and inhibit pepsin activity, and moreover they tend to decrease exogenous hypercholesterolemia. Still further, they are anti-biotics variously effective against bacteria such as *Diplococcus pneumoniae*, fungi such as *Trichophyton mentagrophytes*, algae such as *Chlorella vulgaris*, and cotyledenous seed germination. They also counteract the heat, swelling, and rubor characteristic of the inflammatory response to tissue insult.

Preparation of the subject compounds proceeds by heating a chloroalkanamide of the formula

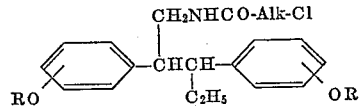

with an amine

Am—H in an inert solvent, such as butanone, and catalyzed by sodium iodide or the equivalent ad libitum. R, Alk, and Am are defined as before). The reaction is carried out in a sealed vessel to the extent necessary to prevent loss by volatilization of the intermediate amine, in process.

Conversion of the basic amides of this invention to corresponding acid addition salts is accomplished by simple admixture thereof with one or two equivalents of any of various inorganic and strong organic acids, the anionic portion of which conforms to T as hereinbefore defined.

The quaternary compounds comprehended are those derived by contacting a claimed basic amide with an organic ester of the formula

Q—T

Q and T being limited by the meanings hereinabove assigned. Either one or two Q—T aggregates may be incorporated, quaternization taking place in the temperature range between 25 and 100 degrees centigrade in an inert solvent such as chloroform, acetone, butanone, methanol, butanol, or the like. The reaction is ordinarily completed in from 1 to 48 hours and is generally carried out in a closed system if a lower alkyl halide—such as methyl chloride—is one of the reagents. Using methyl bromide, the preparation of quaternary salts may be smoothly effected in butanone solution at 70 degrees centigrade after a reaction period of approximately 1 hour.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A. *2,3 - bis(p-methoxyphenyl)pentylamine.*—Approximately 108 parts of 2,3-bis(p-methoxyphenyl)pentanenitrile melting at around 130–131° [J. Amer. Chem. Soc., 70, 3424 (1948)] is continuously extracted with the condensate from a solution of 31 parts of lithium aluminum hydride in 3000 parts of anhydrous ether heated at the boiling point under reflux. When all of the 2,3-bis(p-methoxyphenyl)pentanenitrile is dissolved (representatively after 6 hours), heating is discontinued; and the reaction mixture is slowly and consecutively diluted with 32 parts of water, 25 parts of aqueous 20% sodium hydroxide, and 112 parts of water. The granular precipitate thrown down is filtered off and extracted with 2000 parts of boiling benzene, and the benzene extract is combined with the filtrate. The resultant solution is stripped of solvent by vacuum distillation. The residue, recrystallized from benzene, affords 2,3-bis(p-methoxyphenyl)pentylamine melting at approximately 143–144°.

B. *2-chloro-N-[2,3-bis(p-methoxyphenyl)pentyl]acetamide.*—A mixture of 30 parts of the 2,3-bis(p-methoxyphenyl)pentylamine of the foregoing part A of this example, 15 parts of chloroacetyl chloride, 21 parts of finely-divided potassium carbonate, and 90 parts of butanone is heated at the boiling point under reflux with agitation for 3 hours. Insoluble salts formed in process are removed by filtration, and the filtrate is freed of solvent by vacuum distillation. The residual white crystalline solid, twice recrystallized from a mixture of acetone and hexane, affords 2 - chloro-N-[2,3 - bis(p-methoxyphenyl)pentyl]acetamide melting at approximately 104.0–104.5°.

C. *2 - dimethylamino - N-[2,3 - bis(p-methoxyphenyl)pentyl]acetamide.*—A solution of 10 parts of the 2-chloro-N-[2,3-bis(p-methoxyphenyl)pentyl]acetamide of the foregoing part B of this example, 10 parts of dimethylamine, and 1 part of sodium iodide in 50 parts of butanone is heated at 60° in a sealed vessel for 8 hours. Solvent is thereupon removed by vacuum distillation, and the residue is partitioned between aqueous dilute sodium hydroxide and ether. The ethereal phase is washed with water, dried over calcium sulfate, treated with decolorizing charcoal, and filtered. The filtrate is freed of solvent by distillation, and the residue is recrystallized from a mixture of acetone and hexane to give colorless 2-dimethylamino-N-[2,3-bis-(p-methoxyphenyl)pentyl]acetamide melting at approximately 114–115°. The product has the formula

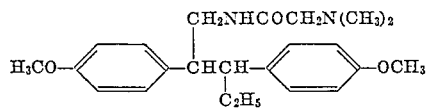

Example 2

*2-diethylamino - N - [2,3-bis(p-methoxyphenyl)pentyl]-acetamide.*—Substitution of 11 parts of diethylamine for the dimethylamine called for in Example 1C and recrystallization from hexane rather than the mixture of acetone and hexane there specified affords, by a procedure otherwise identical, 2 - diethylamino - N-[2,3-bis(p-methoxyphenyl)pentyl]acetamide as a colorless solid melting at 88–90°. The product has the formula

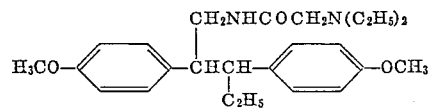

Example 3

A. *3 - chloro-N-[2,3-bis(p-methoxyphenyl)pentyl]propionamide.*—Substitution of 16 parts of 3-chloropropionyl chloride for the chloroacetyl chloride called for in Example 1B affords, by the procedure there detailed, 3-chloro-N-[2,3-bis(p-methoxyphenyl)pentyl]propionamide melting at approximately 123–124°.

B. *3-dimethylamino-N-[2,3 - bis(p - methoxyphenyl)-pentyl]propionamide.*—Substitution of 10 parts of 3-chloro-N-[2,3-bis(p-methoxyphenyl)pentyl]propionamide for the 2-chloro-N - [2,3-bis(p - methoxyphenyl(pentyl]-acetamide called for in Example 1C affords, by the procedure there detailed, 3-dimethylamino - N-[2,3 - bis(p-methoxyphenyl)pentyl]propionamide melting at approximately 115–116°. The product has the formula

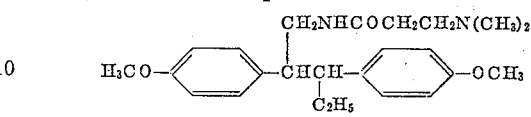

C. *3-dimethylamino-N - [2,3 - bis(p-methoxyphenyl)-pentyl]propionamide hydrochloride.*—Addition of just sufficient hydrogen chloride to an ethereal solution of 3-dimethylamino-N - [2,3-bis(p-methoxyphenyl)pentyl]-propionamide to induce acidity therein effects precipitation of 3-dimethylamino-N - [2,3-bis(p-methoxyphenyl)-pentyl]-propionamide hydrochloride which, filtered off and dried in air, melts at 167–169°.

Example 4

A. *3-diethylamino - N-[2,3 - bis(p-methoxyphenyl)-pentyl]propionamide.*—A solution of 7 parts of 3-chloro-N - [2,3 - bis(p-methoxyphenyl)pentyl]propionamide, 5 parts of diethylamine, and 1 part of sodium iodide in 40 parts of butanone is heated in a sealed vessel at 50° for 16 hours. Solvent is thereupon removed by vacuum distillation, and the residual oil is partitioned between aqueous dilute sodium hydroxide and ether. The ethereal phase is washed with water, dried over anhydrous potassium carbonate in the presence of decolorizing charcoal, and filtered. Evaporation of solvent from the filtrate affords 3 - diethylamino - N - [2,3 - bis(p-methoxyphenyl) pentyl]propionamide as an oil. The product has the formula

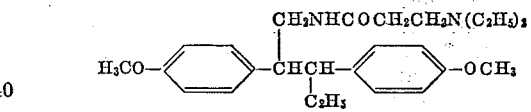

B. *3-diethylamino - N - [2,3-bis(p-methoxyphenyl)-pentyl]propionamide hydrochloride.*—An ethereal solution of the 3-diethylamino-N-[2,3-bis(p-methoxyphenyl)-pentyl]propionamide of the foregoing part A of this example is made just acid with 2-propanolic hydrogen chloride. Precipation of 3-diethylamino-N-[2,3-bis(p-methoxyphenyl)pentyl]propionamide hydrochloride occurs. Filtered off and recrystallized from a mixture of ethanol and ether, it affords colorless 3-diethylamino-N-[2,3 - bis(p-methoxyphenyl)pentyl]propionamide hydrochloride melting at approximately 137–138°.

What is claimed is:

1. A compound of the formula $$H_3CO-\langle\rangle-CHCH-\langle\rangle-OCH_3$$
with $CH_2NHCO$-lower alkylene-$N$(lower alkyl)$_2$ and $C_2H_5$ substituents 2. 2-dimethylamino - N - [2,3-bis(p-methoxyphenyl)-pentyl]acetamide.
3. 2-diethylamino - N - [2,3-bis(p-methoxyphenyl)-pentyl]acetamide.
4. 3-dimethylamino - N - [2,3-bis(p-methoxyphenyl)-pentyl]propionamide.
5. 3-diethylamino - N - [2,3-bis(p-methoxyphenyl)-pentyl]propionamide.
6. A compound of the formula $$H_3CO-\langle\rangle-CHCH-\langle\rangle-OCH_3$$
with $CH_2NHCO$-lower alkylene-$Cl$ and $C_2H_5$ substituents No references cited.